April 6, 1926. 1,579,603

M. J. ETIENNE

END GATE

Filed Sept. 11, 1925 2 Sheets-Sheet 1

M. J. Etienne
INVENTOR

BY Victor J. Evans
ATTORNEY

WITNESS:

April 6, 1926. 1,579,603
M. J. ETIENNE
END GATE
Filed Sept. 11, 1925 2 Sheets-Sheet 2
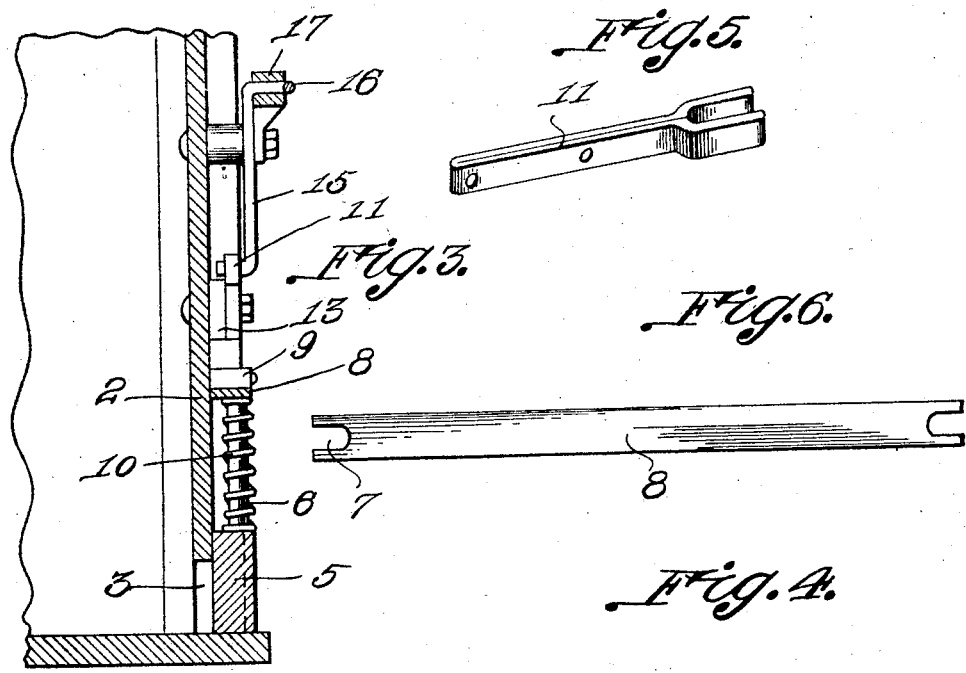
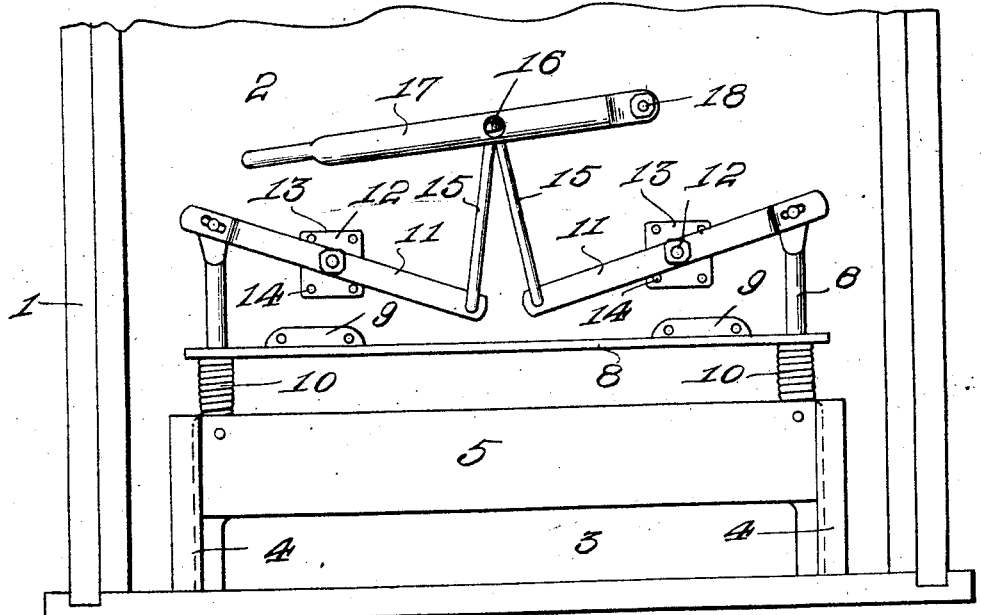
M. J. Etienne
INVENTOR
BY Victor J. Evans
ATTORNEY
WITNESS:

Patented Apr. 6, 1926.

1,579,603

UNITED STATES PATENT OFFICE.

MITCHAEL J. ETIENNE, OF CONRAD, MONTANA.

END GATE.

Application filed September 11, 1925. Serial No. 55,828.

*To all whom it may concern:*

Be it known that I, MITCHAEL J. ETIENNE, a citizen of the United States, residing at Conrad, in the county of Teton and State of Montana, have invented new and useful Improvements in End Gates, of which the following is a specification.

The object is the provision of an outlet gate or valve for grain boxes, such for instance as grain conveying wagons, of a construction which will positively seal the opening to be closed thereby, regardless of the vibration to which the box is subjected, and also which may be easily raised to partly or fully open positions when the grain is to be delivered from the box.

To the attainment of the foregoing, the invention consists in the improvement as hereinafter described and definitely claimed.

In the drawings:—

Figure 3 is a section on the line 3—3 of Figure 1.

Figure 4 is a view substantially similar to Figure 2 but showing the gate or valve in raised position.

Figure 5 is a perspective view of one of the links employed.

Figure 6 is a plan view of a guide plate.

Figure 1:
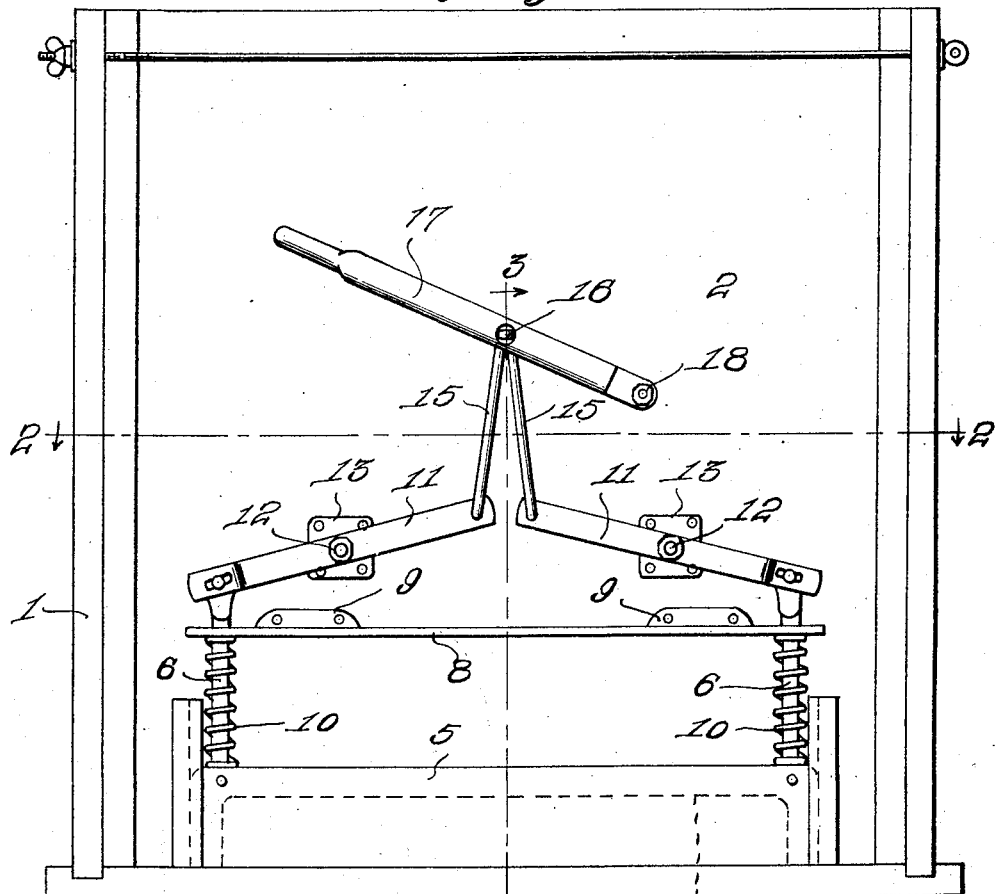
Figure 1 is a rear elevation of a grain box or wagon provided with the improvement.
Figure 2:
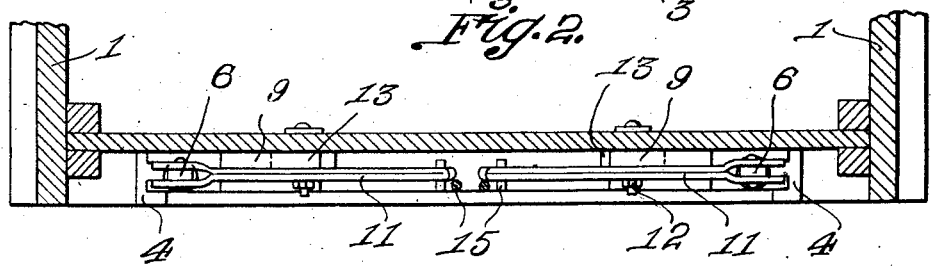
Figure 2 is a section on the line 2—2 of Figure 1.

Referring now to the drawings in detail, the numeral 1 designates a grain box, such as the body of an ordinary grain wagon. The end gate 2 of the grain box is provided at its lower end with a substantially rectangular opening 3 that affords an outlet for the grain. Secured on the end gate 2, at the opposite sides of the opening 3, there are upstanding grooved guides 4. Received in the grooved guides 4 there is a plate 5. The plate is in the nature of a gate or valve, and has secured on its upper edge, adjacent to its ends, upstanding rods 6. These rods 6 pass through notches 7 in a guide plate 8. The plate underlies and is preferably secured to blocks 9 that are fixed on the end gate 2. Between the valve plate 5 and the guide plate 8 there are coil springs 10 which normally influence the valve plate 5 to closed position and likewise effectively hold the said valve 5 in such closed position.

The rods 6 have loosely connected to their outer ends links 11, respectively. The links are directed toward each other and each of the said links is pivotally supported, as at 12, on a pintle that extends centrally from a plate 13 which is secured, by means 14, to the end gate 2.

The inner ends of the links 11 have pivotally or loosely connected therewith rods 15, respectively. These rods, in turn are pivotally secured, as at 16, to an operating lever 17. The lever 17 has one of its ends pivoted, as at 18, to the end gate 2.

The springs 10 will normally force the valve to close the opening 3, and as inferred, will retain the said valve in such position regardless of the vibrations to which the box 1 is subjected. A downward pull on the lever 17 will cause the rods 15 to swing the links 11 to the position illustrated in Figure 4 of the drawings. This draws the rod 6 outwardly and likewise raises the valve or gate 5 against the pressure of the springs 10. A release of the handle will automatically close the valve or gate 5.

While I have illustrated a satifactory embodiment of my improved device, my features of invention are capable of extended application and I do not wish to be limited to the specific structure herein shown and described.

Having described the invention, I claim:

1. The combination with a grain box having an outlet opening in the rear end thereof, guides thereon at the opposite sides of the opening, a valve plate movable through said guides, rods extending upwardly from the ends of the valve plate, a guide for the rods, a helical spring surrounding each rod and exerting a pressure between the guide plate and the valve plate for forcing the latter downwardly to close the opening in the grain box, and lever actuated means pivotally secured on the grain box and loosely connected with the rods for moving the valve to open position.

2. The combination with a grain box having a grain outlet opening in the end gate thereof, and grooved guides at the opposite sides of the opening, of a valve plate received in the guides, rods extending from the upper edge of the valve plate, a notched guide plate secured on the end gate through which the rods are guided, helical springs surrounding the rods and exerting a tension between the guide plate and the valve, a pivotally supported link loosely connected with each rod and directed inwardly, a rod loosely secured on the inner end of each link and a lever pivotally secured on the end gate to which the rods are loosely connected.

In testimony whereof I affix my signature.

MITCHAEL J. ETIENNE.